(12) United States Patent
Ohno et al.

(10) Patent No.: US 8,039,088 B2
(45) Date of Patent: Oct. 18, 2011

(54) HONEYCOMB STRUCTURE

(75) Inventors: Kazushige Ohno, Ibi-Gun (JP);
Masafumi Kunieda, Ibi-Gun (JP);
Takahiko Ido, Ibi-Gun (JP); Ikuhito Teshima, Ibi-Gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 277 days.

(21) Appl. No.: 12/359,957

(22) Filed: Jan. 26, 2009

(65) Prior Publication Data
US 2009/0291254 A1 Nov. 26, 2009

(30) Foreign Application Priority Data
May 20, 2008 (WO) .................. PCT/JP2008/059268

(51) Int. Cl.
*B32B 3/00* (2006.01)
*B01D 50/00* (2006.01)
*B01J 8/02* (2006.01)

(52) U.S. Cl. ........ 428/116; 428/118; 422/168; 422/179; 422/180; 422/221; 422/222

(58) Field of Classification Search .................. None
See application file for complete search history.

(56) References Cited

U.S. PATENT DOCUMENTS

| | | |
|---|---|---|
| 2005/0266991 A1 | 12/2005 | Ohno et al. |
| 2006/0073960 A1 | 4/2006 | Matsumoto et al. |
| 2006/0292044 A1* | 12/2006 | Ohno et al. .................. 422/168 |
| 2007/0259770 A1* | 11/2007 | Hofmann et al. ............... 502/60 |
| 2008/0083202 A1* | 4/2008 | Kunieda et al. ................ 55/523 |

FOREIGN PATENT DOCUMENTS

| | | |
|---|---|---|
| DE | 102007003121 | 7/2008 |
| EP | 1486242 | 12/2004 |
| EP | 1974797 | 10/2008 |
| EP | 1977827 | 10/2008 |
| EP | 2000194 | 12/2008 |
| JP | 61-171539 | 8/1986 |
| JP | 8-112809 | 5/1996 |
| JP | 08-336819 | 12/1996 |
| WO | WO 97/02414 | 1/1997 |
| WO | WO 2004/045765 | 6/2004 |
| WO | WO 2006/040874 | 4/2006 |
| WO | WO 2006/137149 | 12/2006 |

OTHER PUBLICATIONS

Extended European Search Report for corresponding EP Application No. 08022348.0-2104, Dec. 28, 2009.

* cited by examiner

*Primary Examiner* — Gordon R Baldwin
(74) *Attorney, Agent, or Firm* — Ditthavong Mori & Steiner, P.C.

(57) ABSTRACT

A honeycomb structure includes at least one honeycomb unit. The at least one honeycomb unit has a longitudinal direction and includes plural cell walls extending from one end face to another end face along the longitudinal direction to define plural cells. The at least one honeycomb unit includes inorganic particles, an inorganic binder, and inorganic fibers. A degree of orientation of the inorganic fibers in an a-axis direction parallel to the longitudinal direction is about 0.5 or less.

29 Claims, 5 Drawing Sheets

← EXTRUDING DIRECTION

HONEYCOMB STRUCTURE

CROSS-REFERENCE TO RELATED APPLICATION

The present application claims priority under 35 U.S.C §119 to International Application No. PCT/JP2008/059268 filed on May 20, 2008, the entire contents of which are incorporated by reference herein.

BACKGROUND OF THE INVENTION

1. Field of the Invention

The present invention relates to a honeycomb structure.

2. Discussion of Background

In order to convert exhaust gases from automobiles, many technologies have been developed. Due partly to an increase in traffic, it is, however, hard to say that adequate measures have been taken. Further, the tendency of controlling exhaust gases from automobiles has been intensifying domestically and internationally. Particularly, NOx in diesel exhaust gas is strictly controlled. The reduction of NOx has been attempted by the control of the combustion system of an engine, but it becomes difficult for this method alone to sufficiently deal with the problem. As a diesel NOx conversion system for this problem, a NOx reduction system (called an SCR system) that reduces NOx using ammonia as a reducing agent has been proposed.

As an in-vehicle catalyst used for such a system, a honeycomb structure that contains zeolite as a catalyst component is known. In general, however, the strength of the zeolite-containing honeycomb structure is likely to be reduced. On the other hand, JP-A-61-171539 proposes a zeolite-containing honeycomb structure to which 5% through 30% by weight of inorganic fibers are added, disclosing that the zeolite-containing honeycomb structure can prevent the generation of cracks in the process of firing.

International Publication No. 2006/040874 discloses a honeycomb structure that contains ceramic particles and inorganic fibers. The inorganic fibers contained in this honeycomb structure are required to meet the condition (the aspect ratio of inorganic fibers≧(the tensile strength of fibers (GPa)/0.3)) in order to improve the bending strength of the honeycomb structure.

The contents of JP-A-61-171539 and International Publication No. 2006/040874 are incorporated by reference herein in their entirety.

SUMMARY OF THE INVENTION

According to an aspect of the present invention, a honeycomb structure includes at least one honeycomb unit. The at least one honeycomb unit has a longitudinal direction and includes plural cell walls extending from one end face to another end face along the longitudinal direction to define plural cells. The at least one honeycomb unit includes inorganic particles, an inorganic binder, and inorganic fibers. A degree of orientation of the inorganic fibers in an a-axis direction parallel to the longitudinal direction is about 0.5 or less.

BRIEF DESCRIPTION OF THE DRAWINGS

Other objects, features and advantages of the present invention will become more apparent from the following detailed description when read in conjunction with the accompanying drawings, in which:

FIGS. 1A and 1B are perspective views of honeycomb structures according to an embodiment of the present invention, wherein FIG. 1A is the honeycomb structure composed of plural honeycomb units and FIG. 1B is the honeycomb structure composed of one honeycomb unit;

DETAILED DESCRIPTION OF THE EMBODIMENTS

Figure 1A:
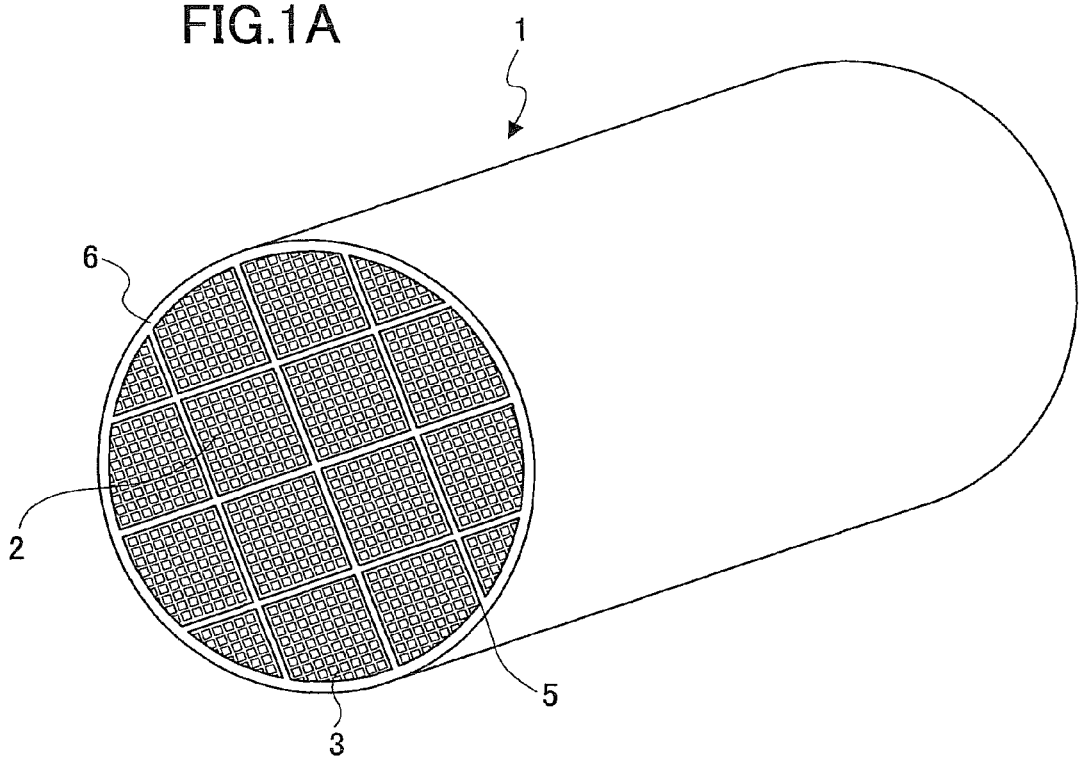

Embodiments will now be described with reference to the accompanying drawings, wherein like reference numerals designate corresponding or identical elements throughout the various drawings.

A honeycomb structure according to an embodiment of the present invention has one or more honeycomb units as fired bodies in which inorganic particles, an inorganic binder, and inorganic fibers are contained and plural cells extending from one end face to the other end face along a longitudinal direction are partitioned by cell walls. An example of the honeycomb structure is shown in the perspective view of FIG. 1A. In the honeycomb structure 1 shown in FIG. 1A, plural honeycomb units 2 bonded together with a bonding material 5 are arranged. Each of the honeycomb units 2 is formed so that cells 3 are arranged in parallel in the longitudinal direction of the honeycomb unit 2. Another example of the honeycomb structure is shown in the perspective view of FIG. 1B. The honeycomb structure 1 shown in FIG. 1B is composed of one honeycomb unit 2. In either kind, the side surface (surface parallel to the cell walls) of the honeycomb structure 1 is preferably covered with a coating material layer 6 so as to maintain its strength. As exemplified in the perspective view of FIG. 2, the honeycomb unit 2, plural of which constitute the honeycomb structure 1, is composed of plural of the cells 3 extending in the longitudinal direction and cell walls 4 partitioning the cells 3 whose through-holes are formed to be parallel to one another.

In the honeycomb unit 2 of the honeycomb structure 1 according to the embodiment of the present invention, assuming that a direction parallel to the extending direction of the through-holes of the cells 3 is an a-axis direction, the degree of orientation of inorganic fibers in the cell walls 4 in the a-axis direction is about 0.5 or less. If the degree of orientation is about 0.5 or less, compressive strength in a b-axis direction perpendicular to the a-axis direction is not easily rapidly reduced. Note that a lower limit of the degree of orientation in the a-axis direction (see FIG. 5) is not particularly specified. However, if the degree of orientation is about 0.1 or greater, the strength of the honeycomb unit 2 is not easily reduced.

Generally, a honeycomb unit is formed by extrusion molding. In this case, when a raw material containing inorganic fibers is extrusion-molded, the inorganic fibers are likely to be naturally oriented along an extruding direction. Inorganic fibers having a relatively high aspect ratio may be easily oriented even by methods other than the extrusion molding. When the inorganic fibers contributing to an improvement in the strength of a honeycomb unit are oriented, the honeycomb unit may have anisotropy in its strength.

The honeycomb unit has high compressive strength in the a-axis direction because of its structure even if the cell walls are made of an isotropic material. However, it is likely to have relatively low compressive strength in the b-axis direction and a c-axis direction perpendicular to the a-axis direction of the cell. This tendency may be more pronounced in the honeycomb unit containing inorganic fibers because the inorganic fibers are easily oriented in the honeycomb unit. On the other hand, in the honeycomb unit 2 of the honeycomb structure 1 according to the embodiment of the present invention, the degree of orientation of the inorganic fibers in the cell walls 4 in the a-axis direction is reduced to about 0.5 or less, which in turn makes the inorganic fibers contribute to an improvement in the strength of the cell 3 in the b-axis and c-axis directions. Note that the shape and the manufacturing step of the honeycomb unit 2 in the b-axis and c-axis directions may be almost the same. Therefore, the strength of the honeycomb unit 2 in the b-axis and c-axis directions is the same unless a specific operation is performed during the manufacturing of the honeycomb unit 2.

Figure 3:
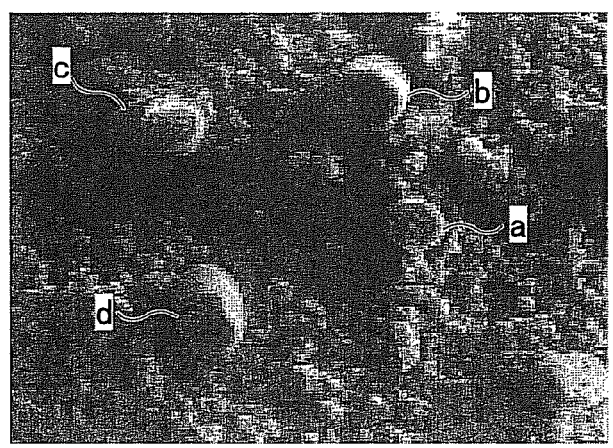
FIG. 3 is an electron micrograph of a cell wall of the honeycomb unit of FIG. 2 as viewed from an a-axis direction.
Figure 4:
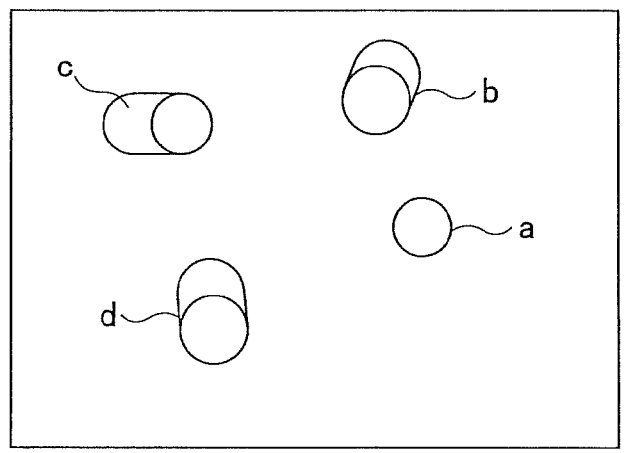
FIG. 4 is a diagram schematically showing inorganic fibers in the electron micrograph of FIG. 3.
Figure 5:
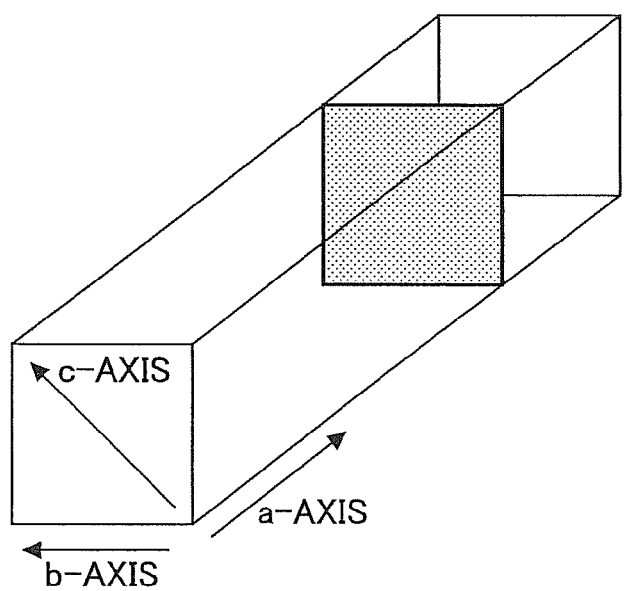
FIG. 5 shows the a-axis direction, a b-axis direction, and a c-axis direction in the honeycomb unit.

FIG. 3 is a micrograph of a broken cell wall 4 magnified by 500 times of the honeycomb unit 2 according to the embodiment of the present invention as viewed from the a-axis direction. In the micrograph, four inorganic fibers "a," "b," "c," and "d" are observed. FIG. 4 is a diagram schematically showing the four inorganic fibers a, b, c, and d. The inorganic fiber "a" shows only its cross section, while the inorganic fibers "b," "c," and "d" show both their cross sections and partial side surfaces. The proportion of the inorganic fibers that do not show their side surfaces but show only their cross sections, such as the inorganic fiber a, to the inorganic fibers visually observed from the micrograph is defined as the degree of orientation in the a-axis direction. In this micrograph, the degree of orientation in the a-axis direction, which is obtained according to the formula (the inorganic fiber a)/(the inorganic fibers a, b, c, and d), is 0.25 (¼). In order to measure the degree of orientation, the number of all the fibers to be observed is set to be about 100 or greater and be preferably about 500 or greater although it depends on the content of the fibers. Furthermore, the magnification ratio of the observed micrograph is set to be in the range of about 250 through about 500 times although it depends on the diameters of the fibers. As shown in FIG. 5, a direction parallel to the extending direction of the through-hole of the cell 4 is defined as the a-axis direction, a direction perpendicular to the a-axis direction is defined as the b-axis direction, and a direction forming an angle of 45 degrees with the a-axis direction is defined as the c-axis direction.

(Honeycomb Unit)

Figure 2:
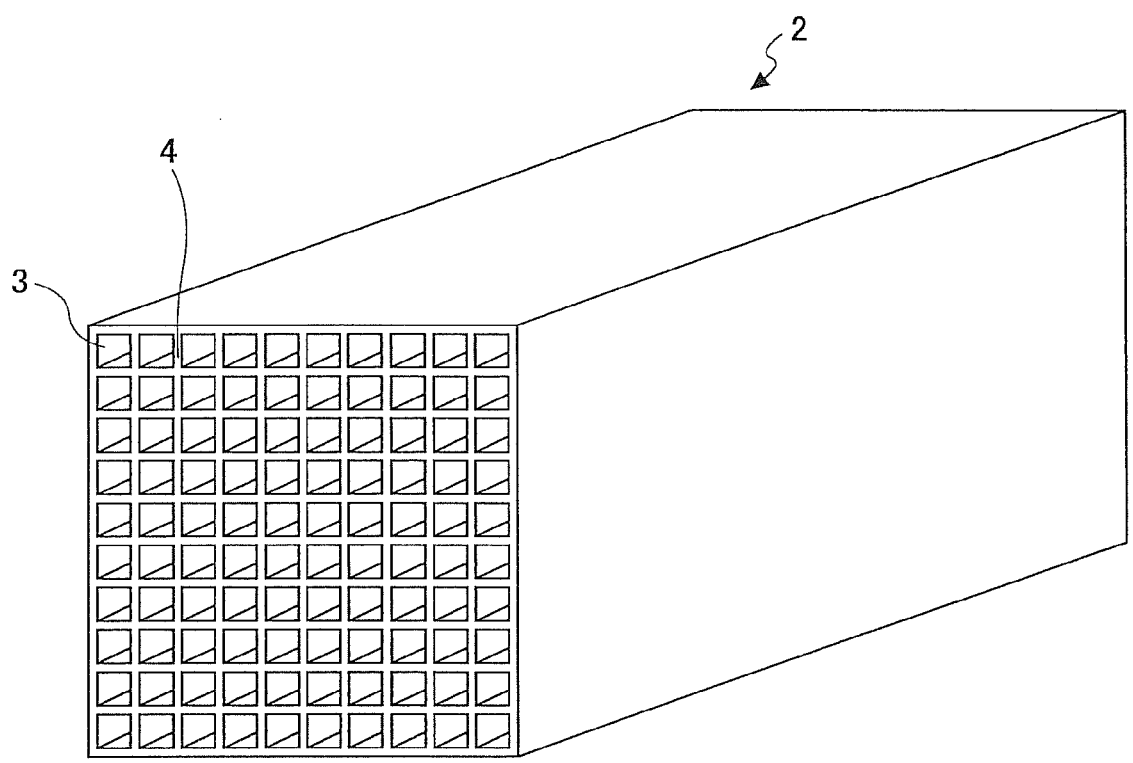
FIG. 2 is a perspective view of the honeycomb unit constituting the honeycomb structure of FIG. 1A.

The honeycomb unit 2 of the honeycomb structure 1 according to the embodiment of the present invention has a so-called honeycomb structure that has the plural cells 3 as parallel through-holes. The cross-sectional shape of each of the cells 3 in the honeycomb unit 2 is not particularly limited. In FIG. 2, the cells 3 having a square cross section are shown, but the cross-sectional shape of the cells 3 may be approximately a triangle, approximately a hexagon, a circle, the combination of a rectangle and an octagon, or the like.

The thickness of the cell walls 4 is preferably in the range of about 0.15 mm through about 0.4 mm and is more preferably in the range of about 0.15 mm through about 0.27 mm. If the thickness of the cell walls 4 is about 0.15 mm or greater, the strength of the honeycomb unit 2 is easily maintained. In addition, if the thickness of the cell walls 4 is about 0.4 mm or less, exhaust gas can easily penetrate into the cell walls 4, which results in efficient use of the whole honeycomb structure 1 for exhaust gas conversion with ease. Therefore, when the honeycomb structure 1 is used as an in-vehicle honeycomb catalyst, uniform exhaust gas conversion performance can be easily maintained and its use efficiency is not easily reduced. Therefore, it is not necessary to increase the size of the honeycomb structure 1.

The porosity of the cell walls 4 of the honeycomb unit 2 is preferably in the range of about 20% through about 40% and more preferably in the range of about 25% through about 40%. If the porosity is about 20% or greater, exhaust gas can easily penetrate into the back of the cell walls 4, which does not easily make an NOx conversion ratio insufficient. In addition, if the porosity is about 40% or less, the strength of the cell walls 4 is not easily reduced.

An opening ratio as an area ratio of opening parts in the cross section (toward which the plural cells 3 perpendicularly open) perpendicular to the longitudinal direction of the cells 3 of the honeycomb unit 2 is preferably in the range of about 50% through about 65%. The opening ratio of the honeycomb unit 2 is preferably about 50% or greater so as not to increase its pressure loss and preferably about 65% or less so as to ensure the cell walls 4 that exercise a conversion action.

In the honeycomb structures as described in JP-A-61-171539 and International Publication No. 2006/040874, the inorganic fibers are oriented in a molded body when extrusion molding as a general method for manufacturing the honeycomb structure is performed. The degree of orientation is different depending on the properties of molding materials and molding conditions, but the inorganic fibers are more easily oriented when an aspect ratio is higher and molding flow is more uniform. Once the inorganic fibers are oriented in the molded body, they remain oriented in the honeycomb structure manufactured by firing the molded body, and the strength of the inorganic fibers in each axis direction may be different depending on the direction and the degree of orientation even in the same composition.

Nevertheless, the orientation of the inorganic fibers is not taken into consideration at all in the honeycomb structures described in JP-A-61-171539 and Pamphlet of International Publication No. 2006/040874. Therefore, when the honeycomb structures are used as an in-vehicle catalyst body or a catalyst carrier, it may not be used for a long period of time because of its insufficient strength in a specific direction.

According to the embodiment of the present invention, it is possible to provide the inorganic-fibers-containing honeycomb structure that has high strength even in a direction perpendicular to the longitudinal direction of a cell as an in-vehicle exhaust gas conversion catalyst and has no possibility of being damaged even when it is installed and used in a vehicle.

The honeycomb unit 2 of the honeycomb structure 1 according to the embodiment of the present invention contains inorganic particles, an inorganic binder, and inorganic fibers.

(Inorganic Fibers)

In the honeycomb structure 1 according to the embodiment of the present invention, the honeycomb unit 2 contains inorganic fibers. An average fiber length and an average fiber diameter of the inorganic fibers in the embodiment of the present invention are preferably in the range of about 30 μm through about 150 μm and about 4 μm through about 10 μm, respectively. If the average fiber length of the inorganic fibers is about 30 μm or greater, an effect of improving the strength of the honeycomb unit 2 easily becomes sufficient. In addition, if the average fiber length of the inorganic fibers is about 150 μm or less, the fibers do not easily aggregate, which easily sufficiently provides the effect of improving the strength of the honeycomb unit 2. Furthermore, if the average fiber length is about 150 μm or less when the inorganic fibers are used as raw material, the inorganic fibers are not easily cut out or do not easily aggregate in an extrusion molding machine, which does not easily the clogging of a die. If the average fiber length is about 4 μm or greater or is about 10 μm or less, the inorganic fibers are not easily oriented in the process of molding a honeycomb molded body.

The inorganic fibers contained in the honeycomb unit 2 are not particularly limited. Examples of the inorganic fibers include one or two or more inorganic fibers selected from alumina fibers, silica fibers, silicon carbide fibers, silica alumina fibers, glass fibers, potassium titanate fibers, and aluminum borate fibers. In order to mold and fire the honeycomb unit 2, zeolite and an inorganic binder are mixed together when these inorganic fibers are used as raw material. The inorganic fibers contribute to the improvement in the strength of the honeycomb unit 2. Note that the inorganic fibers may not only be long fibers but also be short fibers such as whiskers.

Examples of the characteristics of the shapes of the inorganic fibers in the honeycomb unit 2 include an aspect ratio other than the length distribution of the fibers, the average fiber length, and the average fiber diameter. The inorganic fibers are inorganic materials having a large aspect ratio (fiber length/fiber diameter), and they may be effective particularly for improving the bending strength of the honeycomb structure 1. The aspect ratio of the inorganic fibers is preferably in the range of about 2 through about 1000, more preferably in the range of about 5 through about 800, and still more preferably in the range of about 10 through about 500. If the aspect ratio of the inorganic fibers is about 2 or greater, the contribution to the improvement in the strength of the honeycomb unit 2 does not easily become small. If the aspect ratio is about 1000 or less, clogging, etc., are not easily likely to occur in a molding die when the honeycomb unit 2 is molded. As a result, moldability is not easily degraded. In addition, when the honeycomb unit 2 is molded, for example, through extrusion molding, the inorganic fibers are not easily folded and the lengths of the inorganic fibers are not easily varied. As a result, the strength of the honeycomb unit 2 is not easily reduced. Here, if there is a distribution of the aspect ratio of the inorganic fibers, its average value is used.

The content of the inorganic fibers contained in the honeycomb unit 2 is preferably in the range of about 3 mass % through about 50 mass %, more preferably in the range of about 3 mass % through about 30 mass %, and still more preferably in the range of about 5 mass % through about 20 mass %. If the content is about 3 mass % or greater, the contribution to the strength of the honeycomb structure 1 does not easily become small. If the content is about 50 mass % or less, the amount of the zeolite contributing to NOx conversion does not become easily relatively small. As a result, the NOx conversion performance of the honeycomb structure 1 is not easily degraded.

(Inorganic Particles)

In the honeycomb structure 1 according to the embodiment of the present invention, the honeycomb unit 2 contains inorganic particles. The inorganic particles contribute to the improvement in the strength of the honeycomb unit 2, and some of the inorganic particles have a catalyst function. In the honeycomb structure 1 according to the embodiment of the present invention, the inorganic particles contained in the honeycomb unit 2 are not particularly limited. However, examples of the inorganic particles include zeolite, alumina, silica, zirconia, titania, ceria, mullite, and precursors thereof. When importance is placed on a function of improving the strength and a function as a catalyst carrier, the alumina or zirconia are desirable among them, and γ-alumina and boehmite are preferably used as the alumina. Note that the honeycomb unit 2 may contain these inorganic particles singly or in combination. As the inorganic particles having a conversion function, the zeolite is preferably used.

The inorganic particles in the honeycomb structure 1 according to the embodiment of the present invention have a hydroxyl group when they are inorganic particles as raw material before being fired. As is the case with many industrially available inorganic compound particles, a hydroxyl group may be provided not only in the inorganic particles as raw material before being fired in the honeycomb structure 1 according to the embodiment of the present invention, but also in the zeolite as raw material. These hydroxyl groups may cause a dehydration condensation reaction to occur when being fired as the honeycomb unit 2 to reinforce the bonding between the particles. Particularly, the inorganic particles as raw material including the alumina particles may be firmly bonded together through the dehydration condensation reaction occurring when the hydroxyl groups are fired.

In the honeycomb structure 1 according to the embodiment of the present invention, when the zeolite and the inorganic particles other than the zeolite are used as raw material, the inorganic particles other than the zeolite are preferably configured so that an average particle diameter of their secondary particles is smaller than or equal to an average particle diameter of the secondary particles of the zeolite. Particularly, the average particle diameter of the inorganic particles other than the zeolite is preferably in the range of about one-first through about one-tenth of the average particle diameter of the zeolite. Thus, the strength of the honeycomb unit 2 is easily improved through the bonding force of the inorganic particles whose average particle diameter is small.

The content of the inorganic particles other than the zeolite contained in the honeycomb unit 2 is preferably in the range of about 3 mass % through about 30 mass % and more preferably in the range of about 5 mass % through about 20 mass %. If the content is about 3 mass % or greater, the contribution to the strength of the honeycomb unit 2 does not easily become small. If the content is about 30 mass % or less, the content of the zeolite contributing to NOx conversion does not easily become relatively small. As a result, the NOx conversion performance is not easily degraded.

(Zeolite)

Zeolite in the honeycomb unit 2 is obtained by bonding zeolite particles together through an inorganic binder. Examples of the zeolite include β zeolite, Y zeolite, ferrierite, ZSM5 zeolite, mordenite, faujasite, zeolite A, zeolite L, and the like. They may be used singly or in combination.

As the zeolite, a molar ratio of silica to alumina (silica/alumina ratio) is preferably in the range of about 30 through about 50.

In addition, the zeolite preferably contains ion-exchange zeolite obtained by exchanging the ions of the above zeolite. The honeycomb unit 2 may be formed by the use of zeolite whose ions are exchanged in advance, or the ions of zeolite may be exchanged after the honeycomb unit 2 is formed. The ion-exchange zeolite whose ions are exchanged by at least one metal species out of Fe, Cu, Ni, Co, Zn, Mn, Ti, Ag, and V is preferably used. The ion-exchange zeolite may use the metal species singly or in combination.

In the honeycomb unit 2 of the honeycomb structure 1 according to the embodiment of the present invention, the content of the zeolite per apparent unit volume of the honeycomb unit 2 is preferably about 230 g/L or greater and more preferably in the range of about 245 g/L through about 300 g/L. If the content of the zeolite per apparent unit volume of the honeycomb unit 2 is about 230 g/L or greater, the NOx conversion performance is not easily degraded. If the content of the zeolite is about 300 g/L or less, the strength of the honeycomb unit 2 and, by extension, of the honeycomb structure 1 is easily maintained when openings required as the honeycomb unit 2 for the NOx conversion catalyst are formed.

In the honeycomb unit 2 according to the embodiment of the present invention, the ratio of content (composition ratio) of the zeolite is preferably in the range of about 60 mass % through about 80 mass %. Because the zeolite contributes to NOx conversion, its content in the honeycomb unit 2 is preferably large. However, if only the content of the zeolite is increased, the content of other constituent substances (such as inorganic fibers and an inorganic binder) must be decreased. As a result, the strength of the honeycomb unit 2 is easily reduced. In addition, if the opening ratio of the honeycomb unit 2 is made too small in order to increase the content of the zeolite, the flow resistance of exhaust gas is likely to become too large in NOx conversion reaction.

The zeolite contains secondary particles, and an average particle diameter of the secondary particles of the zeolite is preferably in the range of about 0.5 μm through about 10 μm. Note that when the average particle diameter of the secondary particles is measured, zeolite particles as particulate raw materials forming the secondary particles before being fired as the honeycomb unit 2 may be used.

(Inorganic Binder)

Because the honeycomb unit 2 is a fired substance, it has only a solid content left therein when water, etc., in an inorganic binder are evaporated. The inorganic binder in the honeycomb unit 2 refers to the solid content in the inorganic binder. Examples of the inorganic binder as raw material include inorganic sol and clay binders. Among them, examples of the inorganic sol include alumina sol, silica sol, titania sol, sepiolite sol, attapulgite sol, and water glass. Examples of the clay binders include white earth, kaolin, montmorillonite, and double-chain structure clays (sepiolite and attapulgite). These inorganic sol and clay binders may be used singly or in combination.

(Catalyst Component)

On the cell walls 4 of the honeycomb unit 2 of the honeycomb structure 1 according to the embodiment of the present invention, a catalyst component may be further supported. The catalyst component is not particularly limited, but noble metals, alkali metal compounds, alkali earth metal compounds, etc., may be used. Examples of the noble metals include one or more selected from platinum, palladium, and rhodium. Examples of the alkali metal compounds include one or more selected from potassium, sodium compounds, and the like. Examples of the alkaline earth metal compounds include barium compounds.

(Manufacturing of Honeycomb Unit)

A description is made of an example of a method for manufacturing the honeycomb unit 2 of the honeycomb structure 1 according to the embodiment of the present invention. First, a raw material paste containing the inorganic particles, the inorganic fibers, and the inorganic binder as main components is prepared, and then it is extrusion-molded to be a honeycomb unit molded body. The inorganic particles preferably contain zeolite. For example, the inorganic particles in which zeolite and γ-alumina are mixed together are preferably used.

The inorganic fibers to be used preferably have an average fiber length in the range of about 30 μm through about 150 μm and an average fiber diameter in the range of about 4 μm through about 10 μm. As a result, the inorganic fibers are not easily cut out in the process of extrusion molding. Furthermore, the inorganic fibers do not easily aggregate with each other to choke the die. Furthermore, the effect of improving the strength of the inorganic fibers due to dispersion failure in the manufactured honeycomb unit 2 is not easily prevented. Note that the length and the distribution of the inorganic fibers can be determined as required depending on classification such as pulverization and screening.

In addition to the zeolite, the inorganic particles, an organic binder, a pore forming material, a dispersion medium, a molding auxiliary agent, etc., may be added to the raw material paste as occasion demands. The organic binder is not particularly limited. Examples of the organic binder include one or two or more organic binders selected from methyl cellulose, carboxymethyl cellulose, hydroxyethyl cellulose, polyethylene glycol, phenol resin, epoxy resin, etc. The composition amount of the organic binder is preferably in the range of about 1 through about 10 parts by mass relative to 100 parts by mass in total of the solid content of all of the material. As the pore forming material, resin powder such as an acrylate resin, a polyolefin resin, a polystyrene resin, and a polyester resin can be used. The organic binder and the pore forming material are important for extrusion molding and adjusting the porosity of the honeycomb unit 2. The amount of the pore forming material may be increased and decreased corresponding to a desired porosity. The dispersion medium is not particularly limited. Examples of the dispersion medium include water, organic solvents (such as toluene), and alcohol (such as methanol). The molding auxiliary agent is not particularly limited. Examples of the molding auxiliary agent include ethylene glycol, dextrin, fatty acid soap, and polyalcohol.

The raw material paste is not particularly limited, but it is preferably mixed and kneaded. In this case, the raw material paste may be mixed through a mixer, an attoritor, etc., and adequately kneaded through a kneader, etc. A method for molding the raw material paste is not particularly limited, but the raw material paste is preferably molded into a shape having the cell 3, for example, through extrusion molding, or the like. In the case of the extrusion molding, the degree of orientation of the inorganic fibers can be adjusted by the control of the structure (a slit length, a back hole size, the shape of a connection part between a slit and a back hole, etc.) of the die of an extrusion molding machine, the shape (a fiber length, a fiber diameter, a volume ratio, etc.) of the inorganic fibers, paste viscosity, extrusion pressure, etc. For example, as shown in the partial cross-sectional view of FIG. 6, the degree of orientation of the inorganic fibers in the structure of the die of the extrusion molding machine can be adjusted through the change of a slit length X at the tip end of the die on the left side of FIG. 6, an inner diameter Y of a back hole on the right side thereof, an inclination angle $\theta$ at a part where the back hole and the slit are connected to each other, etc.

Next, the honeycomb unit molded body thus obtained is dried. A drying apparatus for drying the molded body is not particularly limited. Examples of the drying apparatus include a microwave drying apparatus, a hot-air drying apparatus, a dielectric drying apparatus, a pressure-reduction drying apparatus, a vacuum drying apparatus, and a freeze drying apparatus. The dried molded body is preferably degreased. Degreasing conditions are not particularly limited, and they can appropriately be selected according to the kinds and amounts of organic matter contained in the molded body. However, the honeycomb unit molded body is preferably degreased for about two hours at about 400° C. The honeycomb unit molded body after being dried and degreased is fired. Firing conditions are not particularly limited, but a firing temperature is preferably in the range of about 600° C. through about 1200° C. and more preferably in the range of about 600° C. through about 1000° C. If the firing temperature is about 600° C. or higher, the sintering of the zeolite, etc., easily progresses. As a result, the strength of the honeycomb unit 2 is easily improved. On the other hand, if the firing temperature is about 1200° C. or lower, the crystallization of the zeolite does not easily disintegrate and the sintering of the honeycomb unit molded body does not excessively progress. As a result, the porous honeycomb unit 2 having a proper porosity is easily manufactured.

(Honeycomb Structure)

The honeycomb structure 1 according to the embodiment of the present invention has one or more honeycomb units 2. In the honeycomb structure 1 having the plural honeycomb units 2, the through-holes of the cells 3 of the honeycomb units 2 are arranged in a stacked manner so as to face the same direction. Examples of the honeycomb structure 1 according to the embodiment of the present invention are shown in the perspective views of FIGS. 1A and 1B. In the honeycomb structure 1 shown in FIG. 1A, the plural honeycomb units 2 bonded together with the bonding material 5 are arranged. Each of the honeycomb units 2 is formed so that the cells 3 are arranged in parallel in the longitudinal direction. As an example, the honeycomb structure 1 shown in FIG. 1B is composed of one honeycomb unit 2. As described above, the honeycomb structure 1 may be composed of the one honeycomb unit 2 or plural honeycomb units 2. Note that the side surface (surface parallel to the longitudinal direction of the cells 3 just referred to as a cross section, and the same applies to the below) of the honeycomb structure 1 is preferably covered with the coating material layer 6 so as to maintain its strength.

Figure 1B:
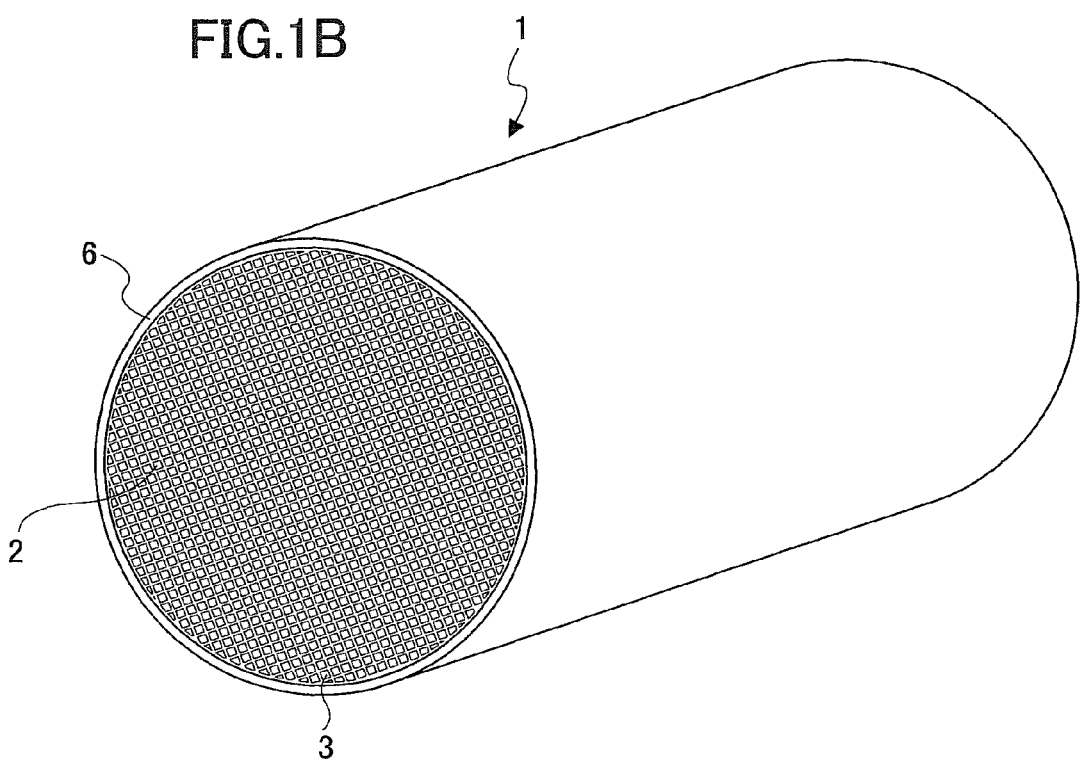

The honeycomb structures 1 shown in FIGS. 1A and 1B have circular cross sections. In the honeycomb structure 1 according to the embodiment of the present invention, the cross section of the honeycomb structure 1 may be a square, a rectangle, a hexagon, a sector form, etc. The cross section of the honeycomb structure 1 may be determined according to uses, but its cross-sectional area is preferably the same with respect to the longitudinal direction of the honeycomb unit 2.

(Manufacturing of Honeycomb Structure)

First, a description is made of a method for manufacturing the honeycomb structure 1 composed of the plural honeycomb units 2. The bonding material 5 is coated on the side surfaces of the honeycomb units 2 obtained in the above manner, and then the honeycomb units 2 are successively bonded together. The aggregate of the bonded honeycomb units 2 is dried and solidified to manufacture a honeycomb unit aggregate of a predetermined size. After that, the side surface of the honeycomb unit aggregate is cut into a desired shape.

The bonding material 5 is not particularly limited. Examples of the bonding material 5 include a mixture of the inorganic binder and the inorganic particles, a mixture of the inorganic binder and the inorganic fibers, a mixture of the inorganic binder, the inorganic particles, and the inorganic fibers, etc. In addition, a mixture of these bonding materials and the organic binder may be used. The organic binder is not particularly limited. Examples of the organic binder include one or two or more organic binders selected from polyvinyl alcohol, methyl cellulose, ethyl cellulose, carboxymethyl cellulose, etc.

The thickness of a bonding material layer for bonding the plural honeycomb units 2 together is preferably in the range of about 0.5 mm through about 2 mm. The number of the bonded honeycomb units 2 may appropriately be determined according to the size of the honeycomb structure 1. The honeycomb unit aggregate obtained by bonding the honeycomb units 2 together by interposing the bonding material 5 may appropriately be cut and polished according to the shape of the honeycomb structure 1.

A coating material is coated on the peripheral surface (side surface), at which the through-holes are not opened, of the honeycomb structure 1 and then dried and solidified to form the coating material layer 6. Thus, the peripheral surface of the honeycomb structure 1 is protected, which in turn can easily improve the strength of the honeycomb structure 1. The coating material is not particularly limited, and it may be made of a material the same as or different from the bonding material 5. In addition, the compounding ratio of the coating material may be the same as or different from the compounding ratio of the bonding material 5. The thickness of the coating material layer 6 is not particularly limited, but it is preferably in the range of about 0.1 mm through about 2 mm. The coating material layer 6 may or may not be formed.

The honeycomb structure 1 is preferably heated after the plural honeycomb units 2 are bonded together by interposing the bonding material 5. If the coating material layer 6 is formed, the honeycomb structure 1 is preferably degreased after the bonding material layer and the coating material layer 6 are formed. If the organic binder is contained in the bonding material layer and the coating material layer 6, the organic binder can be degreased and eliminated through degreasing. The degreasing conditions may appropriately be determined according to the kinds and amounts of the organic matters contained, but the organic binder is preferably degreased for about two hours at about 700° C.

As an example of the honeycomb structure 1, FIG. 1A shows a conceptual diagram of the cylindrical honeycomb structure 1 in which are bonded together the rectangular-parallelepiped honeycomb units 2 whose cross section perpendicular to the longitudinal direction of the through-holes is a square. In the honeycomb structure 1, the honeycomb units 2 are bonded together by interposing the bonding material 5. Furthermore, the peripheral surface of the honeycomb structure 1 is cut into a cylindrical shape, and then the coating material is put on the peripheral surface to form the coating material layer 6. Note that it is also possible to provide a predetermined honeycomb structure 1 using the bonded honeycomb units 2 manufactured to have its cross section of a sector form or a square. Thus, the steps of cutting and polishing the honeycomb unit aggregate may be omitted.

Second, a description is made of a method for manufacturing the honeycomb structure 1 as shown in FIG. 1B composed of one honeycomb unit 2. The honeycomb structure 1 of FIG. 1B can be manufactured in the same manner as the honeycomb structure 1 of FIG. 1A except that it is composed of one honeycomb unit 2. In the same manner as when the honeycomb structure 1 composed of the plural honeycomb units 2 is manufactured, the honeycomb unit 2 is cut into a cylindrical shape and then polished as occasion demands, and the bonding material 5 the same as the above is put on the side surface of the honeycomb unit 2 to form the coating material layer 6. After that, the honeycomb structure 1 is degreased. In this manner, the honeycomb structure 1 composed of the one honeycomb unit 2 as shown in FIG. 1B can be manufactured.

EXAMPLES

Next, a description is made of examples of the honeycomb structure 1 manufactured under various conditions, but the present invention is not limited to the examples.

Example 1

(Manufacturing of Honeycomb Unit)

Figure 6:
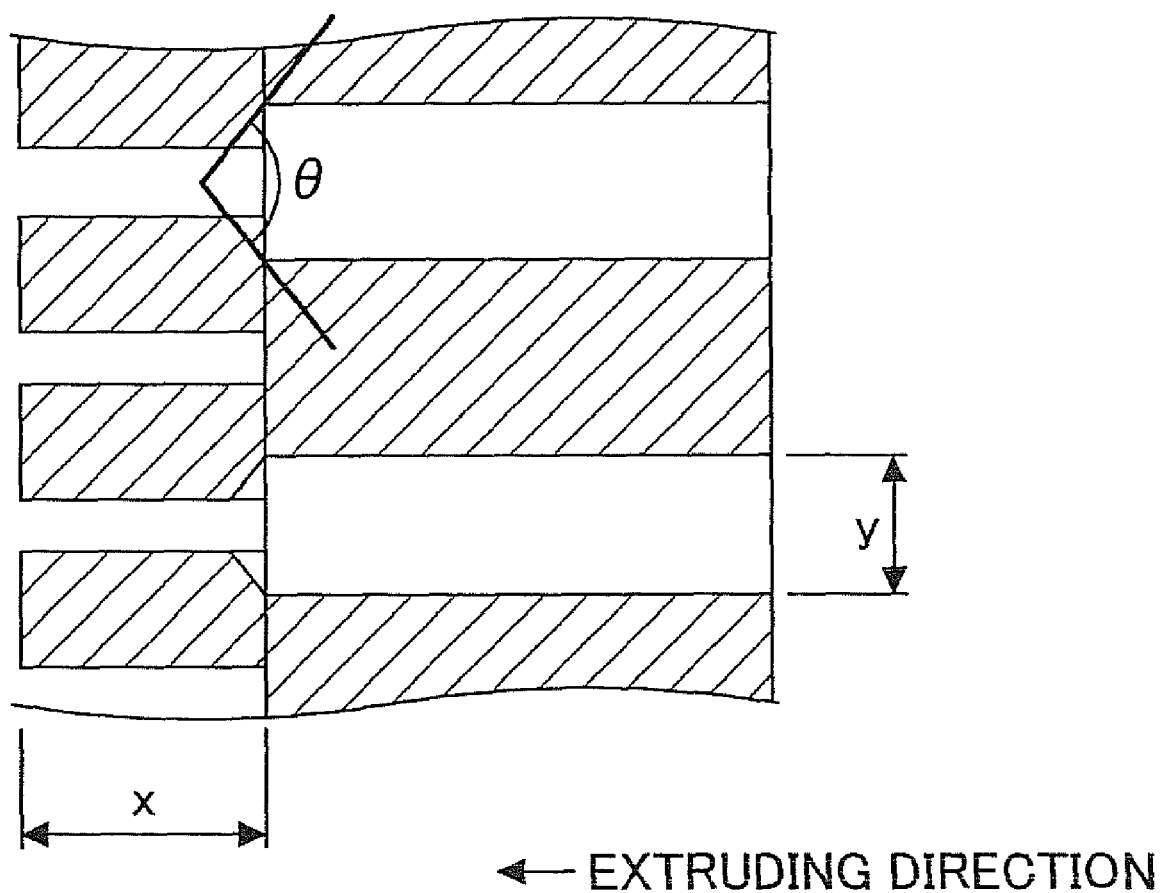
FIG. 6 is a cross-sectional view showing a part of a cross section of a die of an extrusion molding machine.

First, 2250 parts by mass of Fe ion-exchange β zeolite (Fe ion-exchange: 3 mass %, silica/alumina ratio: 40, specific surface area: 110 m$^2$/g, and average particle diameter (of secondary particle diameter, and the same applies to the below): 2 μm), 2600 parts by mass of alumina sol (solids content: 20 mass %), 715 parts by mass of γ-alumina (average particle diameter: 2 μm), 615 parts by mass of alumina fibers (average fiber diameter: 6 μm and average fiber length: 100 μm), and 410 parts by mass of methyl cellulose as an organic binder were put in a container for manufacturing a molding mixed composition and then mixed together. In addition, small amounts of a plasticizer, a surfactant, and a lubricant were added to the mixture, and then water was added thereto. The mixture was mixed and kneaded with its viscosity adjusted. Thus, a molding mixed composition was obtained. Next, the mixed composition was extrusion-molded using an extrusion molding machine to obtain a raw honeycomb molded body. The die of the extrusion molding machine has a structure as shown in FIG. 6 in which a slit length X is 20 mm, a back hole diameter Y is 1.3 mm, and a connection part angle θ between a slit and a back hole is 60°. Note that as Fe ion-exchange zeolite, the one obtained by impregnating an iron nitrate ammonium solution with zeolite particles and exchanging its Fe ions was used. An ion-exchange amount was obtained through an IPC emission spectrometry using the ICPS-8100 (manufactured by Shimadzu Corporation).

The obtained raw honeycomb molded body was adequately dried by using a microwave drying apparatus and a hot-air drying apparatus and degreased for two hours at 400° C. After that, the honeycomb molded body was held and fired for two hours at 700° C. to manufacture a rectangular-pillar-shaped honeycomb unit (35 mm×35 mm in cross section×150 mm in length) whose cell shape is a rectangle (square). The manufactured rectangular-pillar-shaped honeycomb unit showed 0.25 mm cell wall thickness, 78 pieces/cm$^2$ cell density, and 40% porosity.

Table 1 shows the parameters of shapes of the alumina fibers, the composition amount of the γ-alumina, and the structure of the die of the extrusion molding machine used when the honeycomb unit was manufactured.

TABLE 1

| | FIBER | | | | γ-ALUMINA | DIE | |
|---|---|---|---|---|---|---|---|
| | DIAMETER (μm) | LENGTH (μm) | COMPOSITION (PARTS BY MASS) | VOLUME RATIO (%) | COMPOSITION (PARTS BY MASS) | SLIT LENGTH X (mm) | BACK HOLE DIAMETER Y (mm) |
| EXAMPLE 1 | 6 | 100 | 615 | 15 | 715 | 20 | 1.3 |
| EXAMPLE 2 | 4 | 65 | 780 | 20 | 550 | 20 | 1.3 |
| EXAMPLE 3 | 6 | 100 | 780 | 20 | 550 | 15 | 1.3 |
| EXAMPLE 4 | 6 | 100 | 780 | 20 | 550 | 20 | 1.2 |
| EXAMPLE 5 | 6 | 100 | 780 | 20 | 550 | 20 | 1.3 |
| EXAMPLE 6 | 6 | 100 | 780 | 20 | 550 | 20 | 1.4 |
| EXAMPLE 7 | 6 | 100 | 780 | 20 | 550 | 30 | 1.3 |
| EXAMPLE 8 | 6 | 30 | 780 | 20 | 550 | 20 | 1.3 |
| EXAMPLE 9 | 6 | 50 | 780 | 20 | 550 | 20 | 1.3 |
| EXAMPLE 10 | 6 | 150 | 780 | 20 | 550 | 20 | 1.3 |
| EXAMPLE 11 | 8 | 135 | 780 | 20 | 550 | 20 | 1.3 |
| EXAMPLE 12 | 6 | 100 | 1230 | 30 | 100 | 20 | 1.3 |
| COMPARATIVE EXAMPLE 1 | 4 | 65 | 780 | 20 | 550 | 40 | 0.8 |
| COMPARATIVE EXAMPLE 2 | 6 | 100 | 780 | 20 | 550 | 40 | 0.8 |
| COMPARATIVE EXAMPLE 3 | 8 | 135 | 780 | 20 | 550 | 40 | 0.8 |

| | DIE CONNECTION PART ANGLE θ (°) | a-AXIS THE NUMBER OF ORIENTATION OF INORGANIC FIBERS (PER mm$^2$) | THE NUMBER OF INORGANIC FIBERS (PER mm$^2$) | DEGREE OF ORIENTATION | EVALUATION b-AXIS COMPRESSIVE STRENGTH (MPa) |
|---|---|---|---|---|---|
| EXAMPLE 1 | 60 | 580 | 3183 | 0.18 | 1.55 |
| EXAMPLE 2 | 60 | 2050 | 9549 | 0.21 | 1.40 |
| EXAMPLE 3 | 50 | 1060 | 4244 | 0.25 | 1.50 |
| EXAMPLE 4 | 60 | 1275 | 4244 | 0.30 | 1.35 |
| EXAMPLE 5 | 60 | 1128 | 4244 | 0.27 | 1.40 |
| EXAMPLE 6 | 50 | 1055 | 4244 | 0.25 | 1.45 |
| EXAMPLE 7 | 60 | 1277 | 4244 | 0.30 | 1.40 |
| EXAMPLE 8 | 60 | 780 | 4244 | 0.18 | 1.40 |
| EXAMPLE 9 | 60 | 920 | 4244 | 0.22 | 1.30 |
| EXAMPLE 10 | 60 | 2015 | 4244 | 0.47 | 1.15 |
| EXAMPLE 11 | 60 | 720 | 2387 | 0.30 | 1.30 |
| EXAMPLE 12 | 60 | 2425 | 6366 | 0.38 | 1.25 |

TABLE 1-continued

| | | | | | |
|---|---|---|---|---|---|
| COMPARATIVE EXAMPLE 1 | 30 | 5050 | 9549 | 0.53 | 0.5 |
| COMPARATIVE EXAMPLE 2 | 30 | 2830 | 4244 | 0.67 | 0.4 |
| COMPARATIVE EXAMPLE 3 | 30 | 1710 | 2387 | 0.72 | 0.4 |

(Manufacturing of Honeycomb Structure)

A bonding material as a paste was coated on the side surfaces of the manufactured rectangular-pillar-shaped honeycomb units so as to make the thickness of the bonding material layer after being dried 1 mm, and then it was dried and solidified at 120° C. The honeycomb units were bonded together in four columns and four rows to manufacture an approximately rectangular-parallelepiped honeycomb aggregate. In manufacturing the bonding material paste, 29 mass % of alumina particles (average particle diameter: 2 μm), 7 mass % of alumina fibers (average fiber diameter: 6 μm and average fiber length: 100 μm), 34 mass % of alumina sol (solid density (solids content): 20 mass %), 5 mass % of carboxymethyl cellulose, and 25 mass % of water were mixed together. The side surface of the manufactured honeycomb aggregate was cut into a cylindrical shape using a diamond cutter, and then a coating material (same as the bonding material) as a paste was coated on the outer surface of the side wall of the cylindrically-shaped honeycomb aggregate so as to make the thickness of the bonding material paste equal 0.5 mm. Thus, the cylindrically-shaped honeycomb aggregate the same in shape as the honeycomb structure 1 shown in FIG. 1A was manufactured. After being dried and solidified at 120° C., the cylindrically-shaped honeycomb aggregate was held for two hours at 700° C. to degrease the bonding material layer and the coating material. As a result, the cylindrically-shaped (about 144 mm in diameter×150 mm in length) honeycomb structure was manufactured.

Examples 2 through 12 and Comparative Examples 1 through 3

The honeycomb units of examples 2 through 12 and comparative examples 1 through 3 were manufactured in the same manner as example 1 except that the parameters of the shapes of the alumina fibers, the composition amount of the γ-alumina, and the structure of the die of the extrusion molding machine were changed as shown in table 1 with respect to the manufacturing conditions of the honeycomb unit 2 of example 1. The cell wall thickness, the cell density, and the polarity of the manufactured honeycomb unit were the same as those of the honeycomb unit 2 of example 1.

(Calculation of Degree of Orientation of Inorganic Fibers in Cell Wall)

The degree of orientation of the inorganic fibers in the cell walls 4 of the honeycomb unit 2 of examples 1 through 12 and comparative examples 1 through 3 was calculated. The manufactured honeycomb unit 2 was cut out so as to form a cross section perpendicular to the a-axis direction. Then, the cut-out cross section of the honeycomb unit 2 was observed with a 500-times microscope to count the number of the alumina fibers on the cut-out cross section. The counted number of the alumina fibers was identified as the number of the inorganic fibers. Among the identified inorganic fibers, the number of the alumina fibers that do not show their side surfaces but show only their cross sections is counted as the number of orientation of the alumina fibers. The number of orientation of the alumina fibers relative to the number of the inorganic fibers is the degree of orientation. The calculation results of the degree of orientation in the a-axis direction of the honeycomb unit 2 of examples 1 through 12 and comparative examples 1 through 3 were shown in table 1.

(Measurement of Bending Strength of Honeycomb Structure (b-Axis Compressive Strength))

The compressive strength of the honeycomb unit 2 of examples 1 through 12 and comparative examples 1 through 3 was measured. In order to measure the compressive strength of the honeycomb unit 2, the strength measuring apparatus 5582 (manufactured by INSTRON, Co., Ltd.) was used. The manufactured square-pillar-shaped honeycomb unit (35 mm×35 mm in cross section×150 mm in length) was compressed in the b-axis direction shown in FIG. 5 to measure a breaking load W. Compressive stress σ in the b-axis direction was calculated according to the formula, σ=W/A, wherein A is the cross sectional area of a load surface. The calculation results of the compressive stress σ in the b-axis direction of the honeycomb unit 2 of examples 1 through 12 and comparative examples 1 through 3 were shown in table 1.

Figure 7:
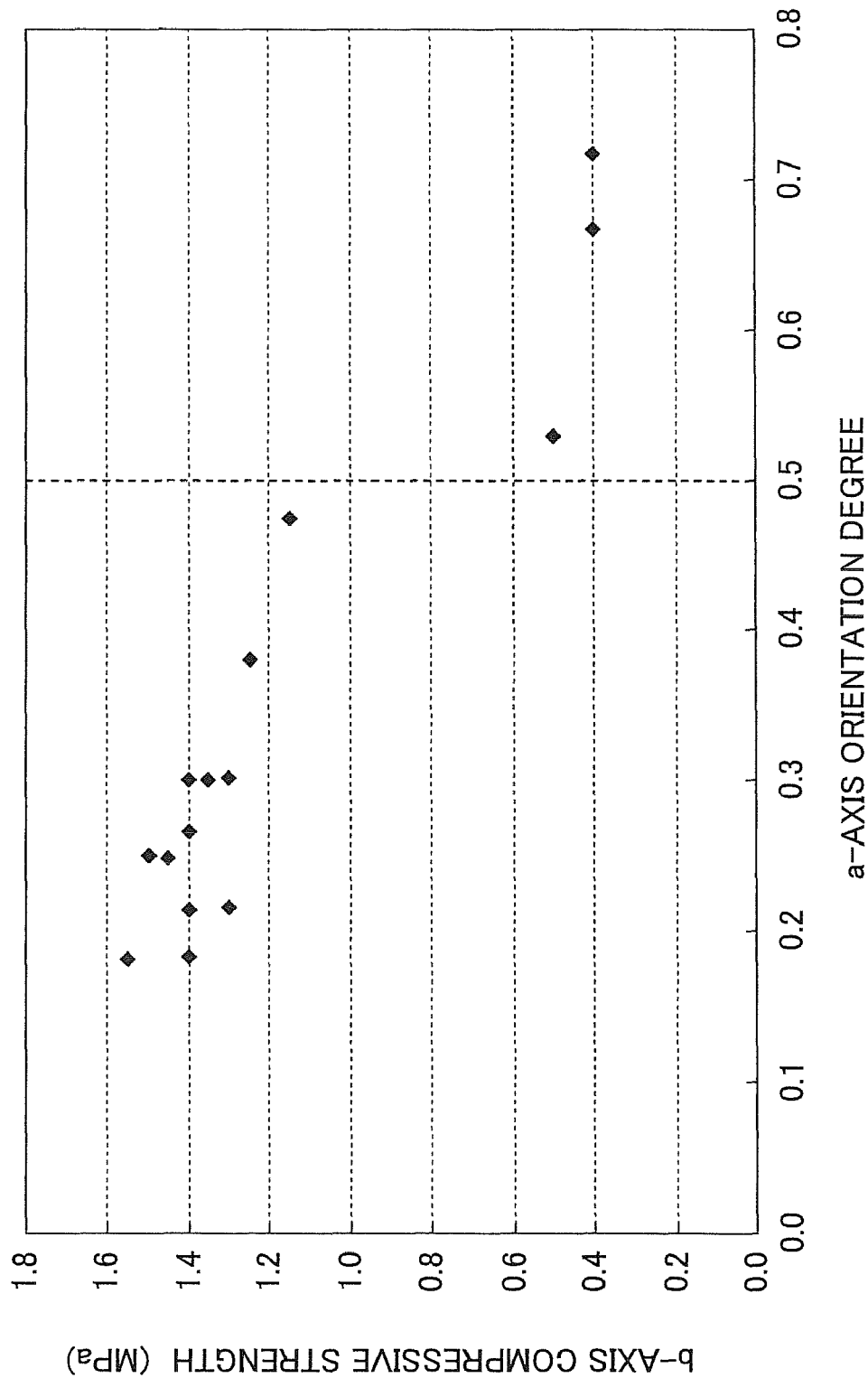
FIG. 7 is a graph showing the degree of orientation in the a-axis direction and compressive strength in the b-axis direction of the honeycomb unit in Examples and Comparative Examples.

The graph of FIG. 7 shows a relationship between the degree of orientation in the a-axis direction (a-axis orientation degree) and the compressive stress σ in the b-axis direction (b-axis compressive strength) of the honeycomb unit 2 of the examples 1 through 12 and comparative examples 1 through 3. In the graph of FIG. 7, the horizontal axis shows the values of the a-axis orientation degree of examples 1 through 12 and comparative examples 1 through 3, and the vertical axis shows the values of the b-axis compressive strength thereof. As apparent from the graph of FIG. 7, the honeycomb unit 2 as a basic unit according to the embodiment of the present invention shows about 0.5 or less of the degree of orientation in the a-axis direction. In this case, the compressive stress σ in the b-axis of the honeycomb unit 2 exceeds 1.0 MPa, but the honeycomb unit 2 of comparative examples 1 through 3 shows 0.5 MPa through 0.4 MPa of the compressive stress σ in the b-axis.

The honeycomb structure 1 according to the embodiment of the present invention is composed of the honeycomb unit 2 having high compressive stress in the b-axis direction, and it can be used as a catalyst or a catalyst carrier for converting exhaust gases from automobiles. Particularly, it is preferred to be used as an NOx conversion catalyst for the SCR system (diesel exhaust gas conversion system using, for example, ammonia) using zeolite.

The present invention is not limited to the specifically disclosed embodiment, but variations and modifications may be made without departing from the scope of the present invention.

What is claimed is:

1. A honeycomb structure comprising:
   at least one honeycomb unit having a longitudinal direction and comprising:
      plural cell walls extending from one end face to another end face along the longitudinal direction to define plural cells;
      inorganic particles;
      an inorganic binder; and
      inorganic fibers, wherein, when a measurement cross section of the at least one honeycomb unit is taken in a direction perpendicular to the longitudinal direction, a proportion of a number of the inorganic fibers exposed along the measurement cross section that show only cross sections thereof to a total number of the inorganic fibers exposed along the measurement cross section is defined as a degree of orientation of the inorganic fibers, and wherein the degree of orientation of the inorganic fibers is about 0.5 or less.

2. The honeycomb structure according to claim 1, wherein a thickness of the cell walls is in a range of about 0.15 mm through about 0.4 mm.

3. The honeycomb structure according to claim 1, wherein an average fiber length of the inorganic fibers is in a range of about 30 μm through about 150 μm and an average fiber diameter of the inorganic fibers is in a range of about 4 μm through about 10 μm.

4. The honeycomb structure according to claim 1, wherein the inorganic fibers comprise at least one of alumina fibers, silica fibers, silicon carbide fibers, silica alumina fibers, glass fibers, potassium titanate fibers, and aluminum borate fibers.

5. The honeycomb structure according to claim 1, wherein the inorganic particles comprise at least one of zeolite, alumina, titania, silica, zirconia, and precursors thereof.

6. The honeycomb structure according to claim 1, wherein the inorganic particles comprise zeolite.

7. The honeycomb structure according to claim 5, wherein the zeolite comprises at least one of β zeolite, Y zeolite, ferrierite, ZSM5 zeolite, mordenite, faujasite, zeolite A, and zeolite L.

8. The honeycomb structure according to claim 5, wherein the zeolite has a molar ratio of silica to alumina (silica/alumina ratio) in a range of about 30 through about 50.

9. The honeycomb structure according to claim 5, wherein an ion of the zeolite is exchanged by at least one of Fe, Cu, Ni, Co, Zn, Mn, Ti, Ag, and V.

10. The honeycomb structure according to claim 5, wherein the zeolite comprises secondary particles, and an average particle diameter of the secondary particles of the zeolite is in a range of about 0.5 μm through about 10 μm.

11. The honeycomb structure according to claim 1, wherein the inorganic binder comprises at least one of alumina sol, silica sol, titania sol, water glass, sepiolite sol, and attapulgite sol.

12. The honeycomb structure according to claim 1, wherein honeycomb structure comprises plural honeycomb units which are bonded together by providing a bonding material between the plural honeycomb units.

13. The honeycomb structure according to claim 1, wherein the honeycomb structure is composed of one honeycomb unit.

14. The honeycomb structure according to claim 1, wherein a side surface of the honeycomb structure is covered with a coating material layer.

15. The honeycomb structure according to claim 1, wherein the degree of orientation of the inorganic fibers is about 0.1 or greater.

16. The honeycomb structure according to claim 1, wherein a porosity of the cell walls is in a range of about 20% through about 40%.

17. The honeycomb structure according to claim 1, wherein an opening ratio of the at least one honeycomb unit is in a range of about 50% through about 65%.

18. The honeycomb structure according to claim 1, wherein an aspect ratio of the inorganic fibers is in a range of about 2 through about 1000.

19. The honeycomb structure according to claim 1, wherein a content of the inorganic fibers contained in the at least one honeycomb unit is in a range of about 3 mass % through about 50 mass %.

20. The honeycomb structure according to claim 5, wherein a content of the inorganic particles other than the zeolite contained in the at least one honeycomb unit is in a range of about 3 mass % through about 30 mass %.

21. The honeycomb structure according to claim 6, wherein a content of the zeolite per apparent unit volume of the at least one honeycomb unit is about 230 g/L or greater.

22. The honeycomb structure according to claim 21, wherein the content of the zeolite per apparent unit volume of the at least one honeycomb unit is in a range of about 245 g/L through about 300 g/L.

23. The honeycomb structure according to claim 6, wherein a ratio of content of the zeolite in the at least one honeycomb unit is in a range of about 60 mass % through about 80 mass %.

24. The honeycomb structure according to claim 1, wherein the inorganic binder includes inorganic sol and a clay binder.

25. The honeycomb structure according to claim 1, wherein a catalyst component is provided on the cell walls.

26. The honeycomb structure according to claim 25, wherein the catalyst component comprises at least one of a noble metal, an alkali metal compound, and an alkali earth metal compound.

27. The honeycomb structure according to claim 12, wherein the plural honeycomb units have cross-sectional shapes of sectors or squares.

28. The honeycomb structure according to claim 1, wherein the honeycomb structure is so constructed to be used as a catalyst or a catalyst carrier for converting exhaust gas from an automobile.

29. The honeycomb structure according to claim 1, wherein the honeycomb structure is so constructed to be used as a NOx conversion catalyst for a SCR system.

* * * * *